United States Patent [19]

Turner, Jr.

[11] Patent Number: 5,049,368
[45] Date of Patent: Sep. 17, 1991

[54] METHOD OF APPLYING PRIMERS ONTO THE BODY FLANGE AND WINDSHIELD OF VEHICLES

[75] Inventor: Herman E. Turner, Jr., Wellington, Ohio

[73] Assignee: Nordson Corporation, Westlake, Ohio

[21] Appl. No.: 492,782

[22] Filed: Mar. 12, 1990

[51] Int. Cl.$^5$ .............................................. B05D 1/02
[52] U.S. Cl. ..................................... 427/424; 427/421
[58] Field of Search ........................ 427/421, 424, 420

[56] References Cited

U.S. PATENT DOCUMENTS

| | | | |
|---|---|---|---|
| 3,852,095 | 12/1974 | Hogstrom | 117/43 |
| 4,337,281 | 6/1982 | Boone | 427/236 |
| 4,753,819 | 6/1988 | Shimada | 427/96 |
| 4,857,367 | 8/1989 | Thorn et al. | 426/348 |
| 4,880,663 | 11/1989 | Shimada | 427/96 |

OTHER PUBLICATIONS

English Translation of Japanese Patent Publication 2-10595, 1990.

Primary Examiner—Shrive Beck
Assistant Examiner—Alain Bashore
Attorney, Agent, or Firm—Wood, Herron & Evans

[57] ABSTRACT

A method of applying a clear glass primer material and then a black glass primer material onto the marginal edge of a windshield and/or rear window of a vehicle, and for applying a black metal primer onto the mating body flanges of the vehicle, in which an airless, cross cut-type flat pattern nozzle is employed to discharge such primer materials at pressures substantially below the normal pressures at which airless spray nozzles are operated to produce an atomized stream. A triangular-shaped liquid film emission of the primer materials is produced by such an airless spray nozzle, operated at low pressures, which forms a well defined pattern on both the windshield and the associated body flanges without splashing or overspray onto the surrounding surfaces.

4 Claims, 1 Drawing Sheet

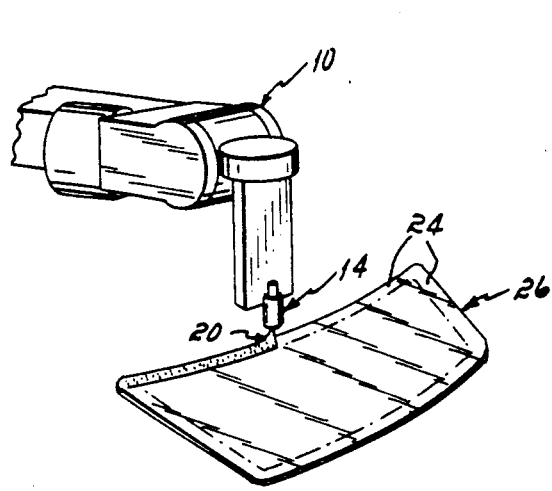
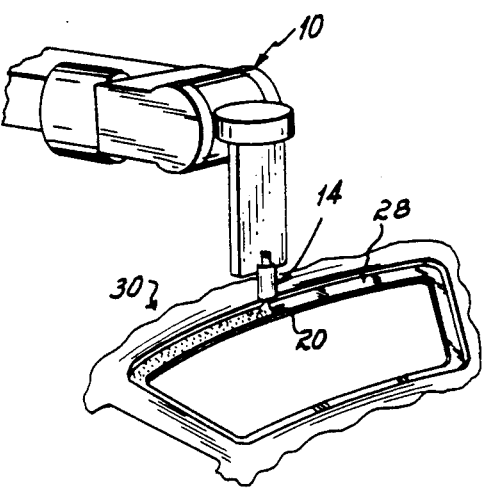
FIG.1  FIG.2
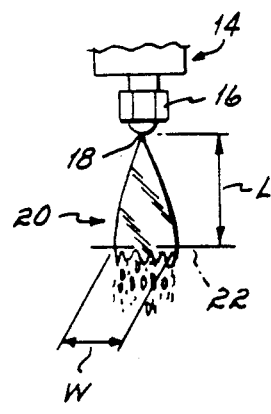
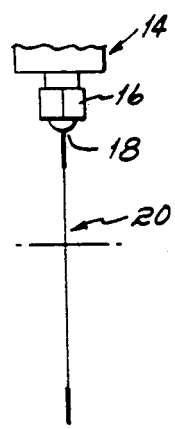
FIG.3  FIG.4
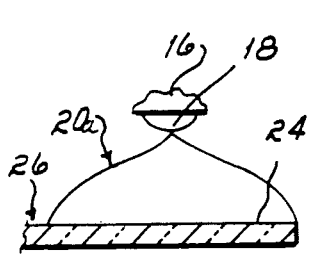
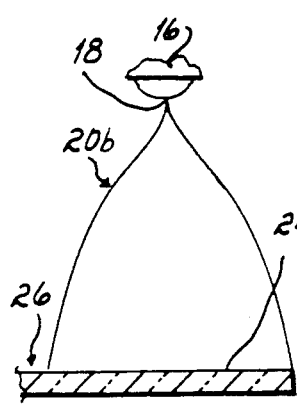
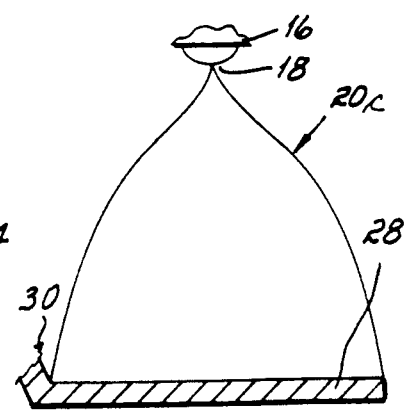
FIG.5A  FIG.5B  FIG.5C

METHOD OF APPLYING PRIMERS ONTO THE BODY FLANGE AND WINDSHIELD OF VEHICLES

FIELD OF THE INVENTION

This invention relates to the method of preparing the windshield and associated body flange of automobiles or other vehicles for bonding to one another, and, more particularly, to a method of applying glass primer coatings onto the marginal edge of the windshield or other glass elements of the vehicle, and a metal primer coating onto the associated body flanges of the vehicle, in preparation of adhesively bonding the glass and body flange together.

BACKGROUND OF THE INVENTION

The assembly of the windshield, rear window and other glass elements of a vehicle to their associated body flanges is an important operation in the manufacture of vehicles, particularly from a safety standpoint. The federal government requires vehicles to pass a windshield retention test, and the materials which are used to assemble the windshield to the body flanges of the vehicle must be properly applied to pass the test and avoid expensive recalls.

The preparation of the windshield and associated body flange of a vehicle for assembly involves a number of operations. With respect to the windshield, glass manufacturers supply automotive windshields with a "blackened area", i.e., an area of predetermined width along the marginal edge of the windshield which is covered with a black, ceramic frit having a roughened surface. It is the responsibility of the automotive manufacturer to prepare this blackened area for assembly to the body flange of the vehicle. First, a clear glass primer material is applied to the blackened area, usually with a wet brush manipulated by a robot or other automated brush mover. Preferably, a felt wick is dragged by the robot immediately behind the wet brush to wipe dry the clear glass primer, and to force the clear glass primer into the roughened surface of the blackened area. The clear glass primer prepares the blackened area for receipt of a coat of black glass primer material as described below.

One problem which has been experienced with the application of clear glass primer onto the blackened area of the windshield is that the primer is not readily visible, and it is difficult to determine how much clear glass primer has been applied and whether the desired amount of the surface area of the ceramic frit has been covered. An inadequate amount or film build of clear glass primer, and/or an incomplete covering of the surface area having the ceramic frit, can result in a failure of the windshield retention test after the windshield is installed.

The next step in the preparation of the windshield for assembly to the vehicle body flange involves the application of a black glass primer over the area which had been previously coated with the clear glass primer. One method of applying the black glass primer to the windshield involves a manual operation using a flow brush or the like. This method is labor-intensive, and human applicators are prone to dripping some of the black glass primer from the brush onto areas outside of the blackened, ceramic frit. Such drips onto the clear portion of the glass are unacceptable and may require rejection of the windshield for use.

Another means of applying the black glass primer onto the marginal edge of the windshield is disclosed, for example, in U.S. Pat. No. 4,857,367 to Thorn et al. This patent discloses an apparatus which comprises a liquid spray nozzle, an air nozzle and a vacuum device which are movable as a unit upon a robot arm relative to the marginal edge of a windshield. The liquid nozzle sprays atomized black glass primer material in a triangular pattern onto the edge of the windshield. In order to prevent oversprayed, atomized black glass primer from being deposited onto the clear portion of the windshield, the air nozzle directs a stream of air from the interior of the windshield outwardly so as to force any oversprayed primer particles away from the interior or clear portion of the windshield. The vacuum device is located beneath and alongside the peripheral edge of the windshield to draw a vacuum thereat and collect the oversprayed primer particles which do not adhere to the glass.

While systems of the type disclosed in U.S. Pat. No. 4,857,367 are intended to avoid the drip-page problem obtained with manual application of the black primer, it has been found that the application of at least some black glass primer onto the clear portion of the windshield can still occur. The vacuum device is not completely effective in collecting the oversprayed, atomized black glass primer discharged from the liquid nozzle, and some of this oversprayed black glass primer can fall onto the clear portion of the windshield.

Another aspect of the windshield assembly operation is the preparation of the body flange of the vehicle which mounts the windshield. A black metal primer is applied to this body flange, typically using a flow brush and/or an atomized spray type of coating dispenser such as a spray gun, both of which are manipulated manually by an operator. The application of the black metal primer must be performed with great care because the exterior surfaces of the vehicle have received a finish coat of paint before the windshield is installed. Drippage or running of the black primer from the flow brush onto the "Class A" or painted surface of the vehicle presents a major quality control problem. In addition to the drippage problem, manual application of the black metal primer with a brush can also result in too much material being applied to the body flange, the formation of streaks thereon and/or a film build-up along one or more areas of the flange. While dispensers such as spray guns which produce an atomized spray of the black metal primer can be utilized along some areas of the body flange of the vehicle, the problem of oversprayed primer from such guns prohibits their use anywhere near the finished, painted surface of the vehicle.

SUMMARY OF THE INVENTION

It is therefore among the objectives of this invention to provide a method of applying the primer coatings to the marginal edge of the windshield or other glass sections of a vehicle, and to their associated body flanges, in which a consistent, uniform coating of primer material is produced and in which dripping, running and/or overspray of the primer material is avoided.

These objectives are accomplished in the method of applying a clear glass primer and then a black glass primer onto the marginal edge of a windshield, rear window or other glass sections of a vehicle, and for applying a black metal primer onto the mating body flanges of the vehicle, in which an airless, flat spray nozzle is employed to discharge these liquid primer materials at supply pressures substantially below the pressures at which such airless flat spray nozzles are normally operated. A triangular-shaped liquid film emission is produced by such flat spray airless nozzle, operated at relatively low pressures, which forms a well defined, flat pattern of primer materials on both the windshield and the associated body flange without splashing or overspray onto the surrounding surfaces.

The method of this invention is generally related to the method of coating printed circuitboards disclosed in U.S. Pat. Nos. 4,753,819 and 4,880,663, both to Shimada, which are owned by the same assignee as this invention, and the disclosures of which are incorporated by reference in their entireties herein. As discussed in detail in the Shimada patents, coating materials such as paint or primers are often "sprayed" onto printed circuitboards and other substrates. Spraying methods are generally classified into two types, i.e., air spraying and airless spraying. In air spraying, a stream of coating material is impacted by separate streams of air to atomize the material for deposition onto a substrate. The airless spraying method involves first pressurizing the coating material, and then atomizing the material into the atmosphere by the ejection force of the pressurized liquid at the discharge orifice of a nozzle.

The spraying of paint and other coatings, using either the air spraying or airless spraying technique, utilizes the atomized part of the coating for application onto the substrate. This atomized part is an area where an essentially infinite number of fine particles of the coating material are suspended in the atmosphere. Because these fine particles are floating almost uniformly, i.e., at equal density, a relatively uniform coating of the paint material can be applied onto a substrate. The primary problem with applying coating material in atomized form, as discussed above with reference to U.S. Pat. No. 4,857,367 to Thorn et al, is that there is no distinct boundary to the mist of fine coating particles and thus the surface to be coated must either be masked, or an air blower or similar device must be provided to direct air against the oversprayed particles, in order to avoid the application of such oversprayed paint particles onto areas where they are not desired.

As set forth in the U.S. Pat. Nos. 4,753,819 and 4,880,663 Shimada patents, it was discovered that a uniform thickness pattern of materials with a certain viscosity could be produced having good edge definition, i.e., sharply defined boundaries, without overspray or splashing of the coating material, by employing flat pattern, airless spray nozzles operated at pressures well below the pressures at which they are normally operated to obtain atomized coating particles. For example, whereas flat pattern, airless-type nozzles are conventionally operated at pressures on the order of about 35 Kg/cm$^2$ (500 psi) or higher, it was discovered that a uniform, splash-free liquid coating emission could be obtained with such airless nozzles operated at pressures in the range of about 2 Kg/cm$^2$ to 8 Kg/cm$^2$, or about 28 psi to 114 psi, for coating materials having a viscosity in the range of about 100–155 cps.

In the method of this invention, primer materials having a much lower viscosity than the materials disclosed in the Shimada patents are employed in connection with the preparation of the marginal edge of a windshield or other glass section of a vehicle, and the associated body flanges, for assembly. The clear glass primer material applied during the first step of preparing a windshield for assembly has a viscosity in the range of about 5–15 cps, and the black glass primer applied atop the clear glass primer has a viscosity in the range of about 10–20 cps. The black metal primer applied to the body flange of the vehicle has a viscosity in the range of about 20–40 cps. In the presently preferred embodiment, the clear glass primer is supplied to a flat pattern, airless spray nozzle at a pressure in the range of about 0.56–0.84 Kg/cm$^2$ (8–12 psi) with a nozzle being positioned about 5–8 mm (0.196–0.315 in.) from the surface of the glass. The black glass primer applied to the windshield, and the black metal primer applied to the body flange, are each supplied to the same type of airless spray nozzle at a pressure in the range of about 1.41–2.11 Kg/cm$^2$ (20–30 psi) with the nozzle being positioned in the range of about 10–20 mm (0.393–0.787 in.) from the glass or body flange.

It has been found that both the clear glass primer and black glass primer applied to the windshield, and the black metal primer applied to the body flange, can be discharged from a flat spray, airless nozzle under the conditions mentioned above in a liquid film emission which produces a uniform coating having good edge definition on the glass and body flanges with essentially no splashing or overspray of material onto the clear surface of the windshield or the finished, painted areas of the vehicle.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 1 is a schematic view of the application of one of the glass primer materials onto the marginal edge of a windshield of a vehicle;

FIG. 2 is a schematic view of the application of a primer material onto the body flange of the vehicle which mounts the windshield depicted in FIG. 1;

FIG. 3 is a front view of a triangular-shaped, liquid film emission of primer material dispensed in accordance with the method of this invention;

FIG. 4 is a side view of the triangular-shaped liquid film emission of FIG. 3;

FIG. 5A is a schematic view of the application of a clear glass primer onto a windshield;

FIG. 5B is a schematic view of the application of a black glass primer onto the windshield of FIG. 5A; and FIG. 5C is a schematic view of the application of a black metal primer onto the body flange of a vehicle.

DETAILED DESCRIPTION OF THE INVENTION

Referring now to the Figs., a portion of an industrial robot arm 10 of the type currently employed in the assembly of automobiles or other vehicles is schematically illustrated. The details of construction of the robot arm 10 form no part of this invention per se, and therefore the detailed structure of the robot arm 10 is not described herein. The robot arm 10 manipulates a spray gun 14 having an airless spray nozzle 16. Preferably, the airless spray nozzle 16 is a cross cut nozzle having a discharge outlet 18 which produces a flat spray pattern. Airless, flat spray nozzles 16 of this type are well known and widely used commercially, and the details of the construction of such nozzles form no part of this invention per se. One type of airless, flat spray nozzle 16 which is suitable for use in this invention is disclosed in U S. Pat. No. 4,337,281 to Boone, owned by the assignee of this invention, the disclosure of which is incorporated by reference in its entirety herein.

Airless spray nozzles of the type disclosed in U.S. Pat. No. 4,337,281 are normally operated at relatively high pressures, i.e., on the order of about 35 Kg/cm$^2$ (500 psi) or higher depending upon the viscosity of the material, in order to obtain atomization of the liquid coating material discharged therefrom. This invention is predicated upon the concept of operating the airless spray nozzle 16 at significantly lower pressures so as to obtain a liquid film emission 20 of the type illustrated in FIGS. 3 and 4. This liquid film emission 20 is a triangular-shaped liquid film, which is substantially free of atomized particles throughout a distance L extending from the discharge outlet 18 of the airless spray nozzle 16 to a location generally designated as 22 having a width W. Below this location or line 22, the liquid film emission 20 begins to break up into atomized particles of primer material. As described below, the discharge outlet 18 of nozzle 16 is positioned above the surface to be coated at a distance no greater than L so that a uniform liquid film emission, without atomized particles, is applied to such surface.

The method of this invention involves the production of a triangular-shaped liquid film emission for each of three different primer materials, which are substantially the same as the liquid film emission 20 illustrated in FIGS. 3 and 4. A triangular-shaped liquid film emission 20a of a clear glass primer material and a triangular-shaped liquid film emission 20b of a black glass primer material are produced for application onto the marginal edge 24 of a glass windshield 26 as viewed in FIGS. 5A and 5B, respectively. A triangular-shaped liquid film emission 20c of a black metal primer is also produced by the method of this invention for application onto the body flange 28 of a vehicle 30 which mounts the windshield 26.

One example in which liquid film emissions 20a, b and c were obtained with the method of this invention is given below.

| Example I | | |
|---|---|---|
| A. Clear Glass Primer For Windshield: | | |
| | Material: | "Betaseal" glass primer 435.18 Essex Specialty Products, Inc. Troy, Michigan |
| | Viscosity: | 9 cps |
| | Pressure: | .56–.84 Kg/cm$^2$ (8–12 psi) |
| | Stand-off: | 5 mm (.196 in.) |
| | Pattern Width: | 15 mm (.591 in.) |
| B. Black Glass Primer For Windshield: | | |
| | Material: | "Betaseal" glass primer 435.20 Essex Specialty Products, Inc. Troy, Michigan |
| | Viscosity: | 15 cps |
| | Pressure: | 1.41–2.11 Kg/cm$^2$ (20–30 psi) |
| | Stand-off: | 13 mm (.512 in.) |
| | Pattern Width: | 15 mm (.591 in.) |
| C. Black Metal Primer For Body Flange: | | |
| | Material: | "Betaseal" Painted Metal Primer 435.34 Essex Specialty Products, Inc. Troy, Michigan |
| | Viscosity: | 30 cps |
| | Pressure: | 1.41–2.11 Kg/cm$^2$ (20–30 psi) |
| | Stand-off: | 17 mm (.669 in.) |
| | Pattern Width: | 19 mm (.748 in.) |

With reference to Example I and FIGS. 1, 2, and 5A-5C, the method of applying the various primer materials to the windshield 26 and to the body flange 28 proceeds as follows. The "clear glass primer" referenced in Example I is applied first to the marginal edge 24 of windshield 26. See FIGS. 1 and 5A. The robot arm 10 positions the spray gun 14 so that the airless spray nozzle 16 is located at a distance or stand-off in the range of about 5–8 mm, and preferably about 5 mm, above the marginal edge 24 of windshield 26. This stand-off is preferably no greater than the distance L of the liquid film emission 20a, i.e., the distance between the discharge orifice 18 of spray nozzle 16 and the line 22 of the liquid film emission 20, so that essentially no atomized particles of the clear glass primer are applied to the windshield 26. At a stand-off of about 5–8 mm, the pattern width of the clear glass primer on the marginal edge 24 of the windshield 26 is in the range of about 15–16 mm (0.591–0.630 in.).

For purposes of the present discussion, it is assumed that the discharge orifice 18 of spray nozzle 16 is positioned at about a distance "L" from the windshield 26 in FIGS. 5A and 5B, and from the body flange 28 in FIG. 5C, as that distance L is defined with reference to FIGS. 3 and 4. At this stand-off or distance from the windshield 26 or body flange 28, the spray nozzle 16 produces liquid film emissions 20a, b or c of primer materials which have a maximum width W at the surface of the windshield 26 or body flange 28 before the emissions 20a, b or c begin to break up into atomized particles. See FIG. 3. It should be understood that the width of the primer material on the windshield 26 and/or body flange 28 could be varied by decreasing the stand-off of spray nozzle 16 within this distance L, if a narrower coating of primer material on such surfaces is desired.

The pressure at which the clear glass primer is supplied to the airless spray nozzle 16 is preferably in the range of about 0.56–0.84 Kg/cm$^2$ (8–12 psi), with the viscosity of such material being in the range of about 5–15 cps, and preferably about 9 cps. The flow rate of clear glass primer supplied to the spray nozzle 16 varies with the speed at which the spray gun 14 is advanced along the marginal edge 24 of windshield 26 by the robot arm 10. If the spray gun 14 is moved at a rate of about 20 lineal inches per second by the robot arm 10 relative to the windshield 26, the flow rate of clear glass primer material to the spray nozzle 16 is on the order of about 0.005 gallons per minute. The flow rate of clear glass primer material to the spray nozzle 16 is increased as the lineal speed at which the spray gun 14 is advanced along the windshield 26 increases. For example, if the spray gun 14 and spray nozzle 16 are advanced along the marginal edge 24 of windshield 26 by the robot arm 10 at a rate of about 40 lineal inches per second, the flow rate of clear glass primer material to the spray nozzle 16 is on the order of about 0.011 gallons per minute.

After the clear glass primer material is applied to the edge 24 of windshield 26, and "wiped dry" by suitable means such as a felt wiper (not shown) carried by the robot arm 10, the windshield 26 is then ready for the application of a black glass primer. In accordance with the method of this invention, the black glass primer having a viscosity in the range of about 10–20 cps, and preferably about 15 cps, is applied by an airless spray nozzle 16 positioned about 15–20 mm (0.591–0.787 in.), and preferably about 13 mm (0.512 in.), from the surface of the marginal edge 24 of windshield 26. This distance or stand-off is no greater than the distance L from the discharge orifice 18 of the spray nozzle 16, and such distance L is greater than the distance L for the clear glass primer because the black glass primer has a higher viscosity. At a stand-off of about 15–20 mm, a pattern width is produced on the marginal edge 24 of windshield 26 in the range of about 15–16 mm, (0.591–0.630 in.), and preferably about 15 mm. The black glass primer is delivered to the spray nozzle 16 at a pressure in the range of about 1.41–2.11 Kg/cm$^2$ (20–30 psi) in order to obtain the liquid film emission 20b illustrated in FIG. 5B. In the presently preferred embodiment, the flow rates at which the black glass primer is delivered to the spray nozzle 16 are dependent upon the speed of lineal movement of the spray gun 14 and spray nozzle 16 along the peripheral edge of the windshield 26. Preferably, the black glass primer is applied at a flow rate of about 0.02 gpm at a speed of about 20 lineal inches per second up to about 0.045 gpm at a speed of about 40 lineal inches per second.

As illustrated in FIGS. 2 and 5C, the application of the black metal primer to the body flange 28 of the automobile 30 is also accomplished with a spray gun 14 and a spray nozzle 16 manipulated by the robot arm 10 to produce a liquid film emission 20c. The viscosity of the black glass primer is in the range of about 20–40 cps, and preferably about 30 cps. The black glass primer is supplied to the spray gun 14 at a pressure in the range of about 1.41–2.11 Kg/cm$^2$ (20–30 psi), and is discharged from the nozzle 14 at a stand-off or distance in the range of about 10–20 mm (0.394–0.787 in.), and preferably about 17 mm (0.669 in.), above the body flange 28.

The flow rate of black metal primer supplied to the spray nozzle 16 is also dependent upon the speed of linear movement of the spray gun 14 and spray nozzle 16 with respect to the body flange 28. Preferably, the black body flange primer is supplied to the spray nozzle 16 at flow rates of between about 0.020 and 0.045 gpm with the spray gun 14 and spray nozzle 16 advanced along the body flange 28 at speeds in the range of about 20 to 40 lineal inches per second.

In accordance with the teachings of the method of this invention, it has been discovered that splash-free, uniform thickness coatings of primer material can be applied to the windshield and associated body flanges of automobiles and other vehicles provided that the pressure at which the primer materials are supplied to the airless spray nozzles 16 herein are in the range of about 0.56–2.11 Kg/cm$^2$ (8–30 psi) for materials having a viscosity in the range of about 5–40 cps, and wherein the stand-off or distance of the discharge orifice 18 of the spray nozzle 16 from the surface of the windshield 26 or body flange 28 is in the range of about 5–20 mm (0.196–1.787 in.). Under these conditions, well defined liquid film emissions 20a, b and c are formed, which are substantially free of atomized particles, and which produce a splash-free coating upon the windshield 26 and body flange 28 having good edge definition. This substantially eliminates the need for masking of the areas outside of the desired primer application area, and substantially avoids dripping or splashing of the liquid primer material onto areas to be left uncoated.

While the invention has been described with reference to a preferred embodiment, it should be understood by those skilled in the art that various changes may be made and equivalents may be substituted for elements thereof without departing from the scope of the invention. In addition, many modifications could be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. The method of applying liquid primer material onto the body flange of a vehicle in preparation for attachment to a section of glass, comprising:
   supplying the liquid primer material to an airless nozzle means;
   controlling the supply pressure of the liquid primer material to the nozzle means such that a liquid film emission is discharged from the nozzle means which is substantially free of atomized particles of liquid primer material;
   positioning the body flange of the vehicle in the path of the liquid film emission discharged from the nozzle means;
   producing relative movement between the nozzle means and the body flange of the vehicle to obtain a uniform, splash-free coating of the liquid primer material on a predetermined area of the body flange while substantially avoiding the application of the liquid primer material outside of the predetermined area of the body flange.

2. The method of claim 1 in which said step of supplying the liquid primer material comprises supplying a liquid primer material having a viscosity in the range of about 20 to 40 cps.

3. The method of claim 2 in which said step of controlling the supply pressure comprises supplying the liquid primer material at a pressure in the range of the equivalent of about 1.41 to 2.11 Kg/cm$^2$.

4. The method of claim 2 in which said step of positioning the body flange comprises positioning the body flange at a distance from said nozzle means in the range of the equivalent of about 10 mm to 20 mm.

* * * * *